3,576,662
METALLIZING PLASTICS SURFACES
Adolf Diebold, Siegfried Marquardt, and Ludwig Doerr, Ludwigshafen (Rhine), and Ludwig Raichle, Limburgerhof Pfalz, Germany, assignors to Badische Anilin- & Soda-Fabrik Aktiengesellschaft, Ludwigshafen (Rhine), Germany
No Drawing. Continuation of application Ser. No. 565,684, July 18, 1966. This application Aug. 1, 1969, Ser. No. 849,576
Claims priority, application Germany, July 16, 1965, P 15 21 152.6
Int. Cl. B44d *1/16*
U.S. Cl. 117—71　　　　　　　　　　　　　　　5 Claims

ABSTRACT OF THE DISCLOSURE

A method for metallizing plastics surfaces by coating said surfaces with a thin layer of iron particles having a mean particle size of about 0.1 to 1 micron finely dispersed in a polyurethane binder, drying and treating the layer with an acidic aqueous solution of a salt of copper or silver.

---

This application is a continuation of our earlier application Ser. No. 565,684, filed July 18, 1966, now abandoned.

This invention relates to a method of metallizing plastics surfaces by coating the surfaces with a layer of small iron particles finely dispersed in a polymer binder, allowing the layer to dry and coppering or silvering it without current.

It is known that metallic conductive layers may be deposited on plastics surfaces by applying thereto a dispersion of a metal pigment in a binder and solidifying it by drying, polymerization or polycondensation. These conductive layers have only relatively low conductance because the dispersed metallic particles do not form a continuance conductive layer throughout the binder. Thus the conductance of these layers does not reach that of metal foils of comparable thickness. Although an increase in the proportion of metal pigment within the layer gives an increase in conductance, it is not always feasible because the adhesion of the conductive layer to the plastics surface is greatly decreased by an increase in metal content.

It is also known that plastics may be provided with a metallic conductive layer by the vacuum-metallizing process. This method is however relatively expensive.

A method has recently become known for the metallization of ABS (acrylonitrile/butadiene/styrene) plastics which consists in treating the cleaned and degreased surface of the plastic with concentrated sulfuric acid so that the surface is chemically roughened. The surface is then treated for example with an acid solution of tin (II) chloride so that metallic tin is adsorbed thereon. This film is then activated with a noble metal solution, for example an ammoniacal silver salt solution, and then coppered chemically. Finally the pretreated surface is coppered in an acid copper electrolyte. Metallic layers can however only be applied to ABS plastics by this method.

According to another prior art method, metallic layers are applied to a plastics surface by applying to the plastic by any convenient coating method iron particles finely dispersed in a binder and/or solvent, drying the coating, coppering by an "electroless" method the resulting disperse layer of iron in a dip bath and, if desired, applying further metallic conductive layers without the use of electricity or galvanically. Adherent metallic layers having good conductivity may be applied to the plastics by this method.

It is an object of this invention to improve said method and to provide particularly firmly adherent metallic coatings on surfaces of synthetic thermoplastic or thermoset polymers.

It is another object of this invention to provide thin metallic coatings on surfaces of plastics articles whose adhesion to the insulating base is not deleteriously affected by an increased metal content even up to more than 400% by weight of the binder.

A further object of this invention is to improve the prior art method and to provide a method which is suitable for a continuous production of metallic coatings on plastics articles such as films and sheets having outstanding conductivity.

A further object is to provide a simple method for the continuous production of printed circuits and of coated films and sheetings eminently suitable as backing for the production of magnetic recording media.

It has been found that these objects can be achieved by applying a layer of particularly small iron particles finely dispersed in a urethane coating lacquer.

According to this invention, in a method for metallizing plastics surfaces by (a) coating said surfaces with a layer of small iron particles finely dispersed in a polymer binder, (b) drying the layer and (c) silvering or, preferably, coppering without current the resultant layer in an aqueous solution of a salt of one of these metals, the improvement comprises employing as said binder a polyurethane cured on said surface.

Polyurethanes commercially used in the field of coating application are well known. It is also well known that urethane coatings produced by reaction of polyisocyanates and organic polyhydroxy compounds on the surface to be coated are excellently resistant to water, solvents and abrasion and have excellent insulating properties such as a high dielectric strength and resistivity. So it was very surprising that urethane coatings can be used in this method and coppering or silvering of the layer in an aqueous copper or silver salt liquor takes place without having abraded the surface of the cured layer. It was particularly surprising that the resulting silvered or coppered layers have such a good conductance (coppered layer between 0.5 and 0.05 ohms per cm.).

Of particular advantage is the efficiency of urethane coating compositions even in small amounts which makes it possible to use mixtures of 20 to 100%, particularly 70 to 100% by weight of the polyurethane or polyurethane forming compounds and 0 to 80%, particularly 0 to 30% by weight of other polymer binders, which are well known to one skilled in the art.

Polyurethanes to be used in coating compositions as described, for example by J. H. Saunders and K. C. Frisch in "Polyurethanes, Part II, Technology," pp. 453 to 608, Interscience Publishers, New York, 1964, and by B. A. Dombrow in "Polyurethanes," 2nd edition, pp. 172 to 191, Reinhold Publishing Corp., New York, 1965, can be used according to this invention.

Very suitable polyurethanes are the reaction products of (a) a polyisocyanate and (b) an organic compound containing at least two hydroxy groups per molecule which is (b1) a soluble polyester prepared essentially from a hydrocarbon substituted by 1 to 3 carboxy groups and 0 or 1 hydroxy group, said substituted hydrocarbon having 2 to 18 carbon atoms, and from a polyhydric aliphatic alcohol having 2 to 12 carbon atoms and 2 to 6 hydroxy groups. The hydroxy polyesters (b1) shall be soluble in an organic solvent. Higher molecular polyesters shall preferably have a branched structure. They are mostly prepared by polycondensation of one or more than one aliphatic and/or aromatic dicarboxylic acid and/or monohydroxymonocarboxylic acids with an aliphatic alcohol. Polyesters from adipic acid and aliphatic diols having 2 to 6 carbon atoms or mixtures of these diols and minor amounts, i.e. up to the amount of the diols, of aliphatic polyols having 3 to 6, preferably 3, hydroxy groups and 3 to 6 carbon atoms are preferred. Examples of aliphatic hydrocarbons substituted by 1 to 3 and preferably 1 to 2 carboxy groups and 0 or 1 hydroxy group and having 2 to 18 carbon atoms are oxalic acid, malonic acid, succinic acid, glutaric acid, pimelic acid, or maleic anhydride, fumaric acid, hydroxy oleic acid, hydroxy caproic acid, and particularly adipic acid and sebacic acid. Aromatic hydrocarbons having 1 to 3 carboxy groups are particularly those of the benzene series having 2 carboxy groups such as phthalic acid or phthalic acid anhydride, isophthalic acid and/or terephthalic acid which preferably are used in mixture with an aliphatic dicarboxylic acid.

Suitable polyhydric aliphatic alcohols having 2 to 12 carbon atoms and 2 to 6 hydroxy groups are particularly those having 2 to 3 hydroxy groups. Examples are ethylene glycol, propylene glycols, butylene glycols, pentane diols, 1,6-hexane diol, 1,7-heptane diol, diethylene glycol, triethylene glycol, thiodiglycol, glycerol, 1,1,1-trimethylolpropane, 1,3,6-hexanetriol, triethanolamine, pentaerythritol, sorbitol and the like.

It is advisable to employ an excess of diol which excess causes the end groups of the polyesters to consist mainly of hydroxy groups, while free carboxy groups occur only to a small degree.

If no other binder is coemployed in the method of this invention polyesters are preferred which have a molecular weight between 300 and about 10,000, preferably between 1,000 and about 5,000, hydroxyl numbers of about 25 to about 600 and acid numbers below about 5.

Examples of very suitable polyesters are the polyesters from adipic acid, hexanetriol and butylene glycol, polyesters from diethylene glycol adipate and butanetriol or polyesters from adipic acid, a minor amount of phthalic acid, and a molar excess of 1,1,1-tris(hydroxymethyl)-propane. Castor oil, which essentially consists of the glyceride of 12-hydroxy oleic acid, is also suitable as hydroxy compound, as well as blown, hydrogenated or alcoholyzed castor oil.

Very suitable polyurethanes are also the reaction products of (a) a polyisocyanate and (b) a soluble organic compound containing at least two hydroxy groups per molecule which is (b2) a polyhydric polyoxyalkylene compound having from 2 to 5 carbon atoms in the oxyalkylene groups. Preferred polyoxyalkylene compounds have a molecular weight of between 400 and 10,000, particularly between 1,000 and 5,000. Any suitable polyhydric polyoxyalkylene compound can be used, such as the condensation products of an alkylene oxide or of an alkylene oxide with a polyhydric alcohol. Suitable alkylene oxides are ethylene oxide, propylene oxide, butylene oxide and tetrahydrofuran. Preferred are polyhydric polyoxyalkylene compounds which have been prepared by condensing from about 5 to 30 moles of propylene oxide or a mixture of propylene oxide and ethylene oxide per functional group of a polyhydric alcohol having 2 to 6, particularly 3 to 6 hydroxy groups and 2 to 12, particularly 3 to 9 carbon atoms, such as glycerol, 1,2,6-hexanetriol, sorbitol, trimethylol propane or pentaerythritol. Other polyoxyalkylene compounds are poly(oxytetramethylene) glycol and poly(oxypropylene) glycol.

Very suitable polyurethanes are also the reaction products of (a) a polyisocyanate and (b) a soluble organic compound containing at least two hydroxy groups per molecule which is (b3) an essentially linear vinyl polymer having a carbon-carbon chain, containing between 0.1 and 38% by weight, preferably between 0.1 and 10% by weight of hydroxy groups but essentially no other group which reacts with the isocyanate group, said polymer having a molecular weight between 1,000 and about 100,000. They are well known to those skilled in the art.

Suitable polymers are copolymers of vinyl chloride, esters of acrylic acid or methacrylic acid and alkanols having 1 to 8 carbon atoms, vinyl esters of alkane monocarboxylic acids having 1 to 12, particularly 1 to 3 carbon atoms, styrene or mixtures of these monomers and an ethylenically unsaturated monomer containing at least one hydroxy group. Examples of such monomers containing a hydroxy group are allyl alcohol, 5-hydroxymethyl-1,4-endomethylene cyclohexene-(2), 6-hydroxymethyl-1,4-endomethylene cyclohexene-(2), and the monoesters of alkane diols having 2 to 8 carbon atoms and ethylenically unsaturated carboxylic acids having 3 to 5 carbon atoms, such as glycol monomethacrylate or 1,4-butanediol monoacrylate. Generally these monomers are used in an amount of 1 to 35%, particularly 5 to 25% by weight of the total amount of monomers used in the preparation of the polymers. Examples of suitable copolymers are copolymers of 60% by weight of vinylchloride, 30% by weight of vinylpropionate and 10% by weight of 1,4-butanediol monomethacrylate; of 70% by weight of n-butylacrylate, 10% by weight of acrylonitrile and 20% by weight of 5-hydroxymethyl-1,4-endomethylene cyclohexene-(2); 20% by weight of styrene, 10% by weight of methyl methacrylate, 10% by weight of tertiary butyl acrylate, 40% by weight of 2-ethylhexyl acrylate and 20% by weight of glycol monoacrylate.

Copolymers of the mentioned monomers which do not react with the isocyanate groups into which 1 to 10% by weight of hydroxy groups have been introduced by hydrolyzing ester groups in the polymer, transesterification or transamidation of ester groups in the polymer can also be used. They can be produced by hydrolyzing polymers of vinyl formate, vinyl acetate or vinyl propionate or by reaction of acrylic or methacrylic ester polymers with hydroxyalkyl amines such as β-hydroxyethylamine.

Suitable polymers are saponified copolymers from 80% by weight of vinyl chloride and 20% by weight of vinyl acetate having a content of hydroxy groups of 1 to 3% by weight and copolymers of 60% vinylchloride, 10% styrene and 30% n-butylacrylate into which bout 1% by weight of hydroxy group have been introduced by reaction with β-hydroxyethyl amine. Preferred copolymers consist of at least 50, particularly at least 70% by weight of units of at least one of the mentioned vinyl monomers which do not react with the isocyanate group and contain about 0.1 to 10% by weight of hydroxyl groups.

Suitable polyurethanes are also the reaction products of (a) a polyisocyanate and (b) a soluble organic compound containing at least two hydroxy groups per molecule which is a polyhydric aliphatic alcohol having 2 to 12 carbon atoms and 2 to 6 hydroxy groups as defined above. They are preferably used in admixture with another polymer binder or polymer hydroxy compound.

It is evident for one skilled in the art that also mixtures of at least one of the polyesters, polyoxyalkylene compounds and interpolymers defined above can be used and mixtures of these compounds with at least one of the polyhydric alcohols defined above. By the addition of polyhydric alcohols, preferably 0.5 to 50% by weight of the total amount of the organic compounds containing at least two hydroxy groups per molecule it is possible to modify the hardness of the resulting polyurethanes in a well known manner.

Preferred polyisocyanates in the preparation of the polyurethanes are aliphatic polyisocyanates having 2 to 4 isocyanato groups and 4 to 22 carbon atoms and aromatic polyisocyanates having 8 to 28 carbon atoms and 2 to 4 isocyanato groups. Examples of suitable polyisocyanates are ethylene diisocyanate, trimethylene diisocyanate, tetramethylene diisocyanate, hexamethylene - 1,6 - diisocyanate, decamethylene diisocyanate, dodecamethylene diisocyanate, cyclohexane diisocyanate, 1,4 - phenylene diisocyanate, 1,3 - phenyldiisocyanate, 2,4 - toluylene diisocyanate, 2,6 - toluylene diisocyanate, mixtures of the two last mentioned diisocyanates in the weight ratio 80:20, 70:30 or 65:35, 4,4' - diphenyl diisocyanate, 1,5-naphthylene diisocyanate, addition products of an excess of these polyisocyanates and a polyhydric alcohol such as the addition product of 3 moles of toluylene diisocyanate and 1 mole 1,1,1-tris(hydroxymethyl) propane or 1 mole hexanetriol and the addition product of 2 mole toluylene diisocyanate and 1 mole of the diester from 1 mole of adipic acid and 2 moles of ethylene glycol. These addition products are particularly suitable. Sometimes it may be advantageous to use the polyisocyanates in a blocked or inactive form such as the bisphenyl carbamates of 2,4- or 2,6-toluylene diisocyanate or 1,5 - naphthylene diisocyanate.

The amount of the polyisocyanates depends on the desired properties, particularly the hardness of the resulting coatings. Generally the ratio of isocyanate equivalents to hydroxyl equivalents NCO/OH is between 1 and 2, particularly between 1 and 1.7.

The application of urethane coating compositions to form thin coatings, e.g. by casting or spraying is well known in the art and of itself not an object of this invention. However, it is preferred to apply a mixture of the polyisocyanate, the polyhydroxy compound and an inert organic solvent, in which the iron particles have been finely dispersed. If another polymer binder is co-employed this polymer binder or its solution should be added to the polyisocyanate, the polyhydroxy compound and the solvent before the dispersion of the iron particles is prepared. Sometimes it is of advantage to disperse the iron particles in a mixture of the solvent and the polyhydroxy compound or in a mixture of the solvent, the polyhydroxy compound and the other polymer binder only and to add the polyisocyanate immediately before the dispersion is applied to the plastics surface.

Suitable other polymer binders which can be used are known to one skilled in the art. They are mostly soluble vinyl polymers, polyesters or polyamides commercially used in the lacquer field. Examples of suitable polymer binders are polyvinyl chloride, after-chlorinated polyvinyl chloride, polyvinyl formal, polyvinyl acetal, polyvinyl butyral, copolymers of 50 to 90% by weight of vinyl chloride and 10 to 50% by weight of vinyl isobutylester, an ester of acrylic or methacrylic acid and an alkanol having 1 to 8 carbon atoms and/or a vinyl ester of a alkane monocarboxylic acid having 1 to 3 carbon atoms, nitrocellulose, polyesters of terephthalic and isophthalic acid, and glycol, polyamides from adipic acid, sebacic acid and hexamethylene diamine and the like. Polymers and copolymers of ethylenically unsaturated compounds such as styrene, alphamethylstyrene, vinyl toluene, acrylonitrile, methacrylonitrile, acrylamide, methacrylamide, vinylamides, butadiene, isoprene esters of acrylic, methacrylic and itaconic acids with alkanols, containing 1 to 8 carbon atoms and small quantities of free unsaturated acids such as acrylic, methacrylic, itaconic and maleic acids, maleic anhydride.

Suitable organic solvents to be used in the production of the coatings are low molecular organic solvents which do not react with isocyanates, preferably aliphatic esters such as ethyl acetate, methylglycol acetate, butylacetate, aliphatic ketones such as acetone, methylethyl ketone, aliphatic or cycloaliphatic ether such as tetrahydrofuran, aromatic hydrocarbons of the benzene series such as benzene, toluene or xylene and particularly mixtures of these solvents.

200 to 450%, particularly 250 to 440%, by weight, based on the weight of the binder components, of finely divided iron is added to the mixture of solvent and binder material, which is then processed for example by means of a colloid mill into a dispersion. The iron particles used should have a mean particle size of about 0.1 to 1, particularly 0.1 to 0.9, micron.

It is advantageous to add to the mixture before or while dispersing the iron particles a small amount, preferably from 1 to about 10% by weight of the binder material of a fatty acid having 10 to 20 carbon atoms such as stearic acid.

The dispersions are applied to the plastics surfaces immediately after their production and solidified in situ, the polyurethane being formed or cured in the layer. In this way, very firmly adherent layers are formed. To increase adhesion, it is advantageous to anneal the base material coated with the iron dispersion for some time at temperatures up to about 60° C. prior to the "electroless" coppering or silvering. A marked improvement in adhesion is noticeable after keeping the coated material for only one hour under the said conditions. It is advantageous to anneal the articles for about three to six hours.

The layers thus obtained should have a thickness of 1 to 10 microns. The coated substrate is then dipped into a liquor containing a silver or copper salt, such as copper sulfate or silver nitrate. Preferably the coppering or silvering is carried out in an acidic aqueous solution which contains 0.01 to 5% by weight of a complexing agent for the metal salt used such as an aliphatic amine, for example triethanol amine, a complexing aliphatic amino acid, such as nitrolotriacetic acid or ethylene diamino tetracetic acid, advantageously in combination with a complexing aliphatic polycarboxylic acid such as tartaric acid, or of a complexing agent such as alkali thiosulfate, and the like. Depending on the concentration of this liquor and its temperature, the iron present in the lacquer base is replaced by the metal of the above mentioned salt. It is possible, depending on the residence time of the layer in the liquor, to remove the whole, or only a portion, of the iron contained in the layer and to replace it by the said metal. This treatment gives adherent and glossy coatings of copper or silver which conduct heat and electricity well.

Further layers of metal may be applied without the use of electricity or by galvanic methods to the undercoat which has been applied without using electricity.

It is a particular advantage of the method of this invention that it is not restricted to special kinds of polymers and layers can be applied to all kinds of plastics surfaces, i.e. to the surfaces of all thermoplastic or thermoset polymers. Examples of suitable plastic material are polyethylene, polypropylene, polystyrene, copolymers of styrene and acrylonitrile, copolymers of styrene and polybutadiene, copolymers of styrene, acrylonitrile and butadiene polymers, polymethyl methacrylate, polyacrylonitrile, polyethylene terephthalate, cured unsaturated polyesters, polycaprolactam, nylon 6,6-polycarbonates, polyurethanes, cellulose acetate, nitrocellulose, cured epoxy resins, cured phenoplastics, cured aminoplasts, polyformaldehyde and trioxane copolymers.

Plastics surfaces which have been metallized by the method according to this invention are suitable for carrying off static electricity and also for the production of electrical screening against high frequency alternating fields. Condensers having minimum dimensions may be prepared from films, sheets or foils coated according to the invention. Such films, sheets or foils are also eminently suitable as backing for the production of magnetic recording media having oxidic magnetizable particles. It may also be used as switch foils.

If salts of ferromagnetic materials, for example salts of iron, nickel or cobalt, mixtures of these salts, be used in the subsequent galvanic deposition of metals, very adherent and abrasion-resistant magnetic coatings may be prepared on the coppered or silvered surface so that the material thus coated may be used direct for magnetic recording purposes. With a layer having a thickness of only 1 micron, recording media having outstanding magnetic properties are obtained.

Printed circuits may be prepared in a simple way by the method according to the invention. For this purpose the conductive lacquer base used for the undercoat may be applied by means of a stencil to the plastics surface followed by coating with copper or silver without the use of electricity.

The invention is illustrated by the following examples.

EXAMPLE 1

A dispersion is prepared from 72 parts by weight of iron powder having a particle size of 0.5 to 0.9 micron, 20.9 parts by weight of after-chlorinated polyvinyl chloride, 5.1 parts by weight of a mixture of equimolar parts of diethylene glycol adipate and 2,6-toluylene diisocyanate, 2 parts by weight of stearic acid and 60 parts by weight of a solvent mixture of 3 parts of tetrahydrofuran and 2 parts of toluene by treatment for three to six hours in a stirred ball mill. The dispersion is filtered through cotton wool at a pressure of about 2 atmospheres gauge and then applied by means of casting equipment to polyvinyl chloride sheet and solidified thereon. The sheet thus coated is passed through a bath containing, per liter of water, 150 g. of copper sulfate, 40 g. of triethanolamine and 27 g. of concentrated sulfuric acid. After five minutes, even at room temperature, the layer of iron is removed with the elimination of hydrogen to such an extent that the surface is provided with a continuous coating of copper (0.8 mg. of Cu per sq. cm.). The coating is dried and polished. It exhibits a beautiful metallic luster, very good adhesion to the plastics surface and good conductance.

The coating procedure is repeated but instead of the mixture of diethylene glycol adipate and 2,4-toluylene diisocyanate and the polyvinyl chloride 12 parts of a copolymer of 70% by weight of n-butylacrylate, 10% by weight of acrylonitrile and 20% of 5-hydroxymethyl-1,4-endomethylene cyclohexene-(2), 10 parts of 1,5-naphthylene diisocyanate and 10 parts of a polyester from terephthalic acid, isophthalic acid and ethylene glycol are used and a film of polyethylene terephthalate is coated with the iron particles dispersed in the lacquer. The coated film is kept for one hour at about 60° C.

The sample of the coated film is coppered without current as described, another sample is silvered by dipping into an aqueous solution of silver nitrate, to which has been added citric acid, sodium thiosulfate and ethylene diamino tetracetic acid.

The resultant copper or silver layers have a good conductance.

Another 0.8 mg. of copper per sq. cm. is deposited on a sample of coppered sheet in the same bath by applying an electric current with a current density rising from 0.2 to 0.8 amps per sq. dm.

A layer of silver is deposited by an electroless method on another sample of the sheet on top of the copper layer thus applied by passing the coppered sheet through a bath containing per liter of water 1.5 g. of silver nitrate, 3 g. of ethylene diamino tetracetic acid, 3 g. of sodium thiosulfate and 2 g. of tartaric acid. 0.08 mg. of silver per sq. cm. can be deposited on the sheeting within three minutes in this way.

The coppered or silvered sheet may be used for example as switch foil for magnetic recording media. When compared with aluminum foils or with plastics foils coated with a silver dispersion which have been hitherto used as switch foils, the life of the switch foils produced according to this invention is seven times as long.

EXAMPLE 2

A dispersion is prepared consisting of 54.7 parts by weight of iron having a particle diameter of from 0.2 to 0.8 micron, 13.7 parts by weight of a polyhydric polyoxypropylene compound prepared by base-catalyzed condensation of 1,1,1-trimethylolpropane (1 mole) and propylene oxide (approximately 50 moles), 1.6 parts by weight of stearic acid and 30 parts by weight of a solvent mixture of 2 parts of ethyl acetate and 1 part of toluene by treatment for 4 hours in a stirred ball mill. The dispersion is filtered through a paper filter candle under pressure and then stirred intensively with 50 parts by weight of cyclohexanone and 11 parts of the reaction product of 3 moles of 2,4-toluylene diisocyanate and 1 mole of 1,1,1-trimethylolpropane. The mixture obtained is sprayed within 2 hours onto the surface of a molding of an ABS polymer, i.e. a copolymer of acrylonitrile, butadiene and styrene. The coated molding is then annealed for about 5 hours at 60° C. and polished. The coated molding is treated in a solution which contains per liter of water, 150 g. of copper sulfate, 40 g. of triethanolamine and 27 g. of concentrated sulfuric acid. Within 30 minutes an adherent glossy coating of metallic copper forms in a layer having a thickness of about 1 micron. This copper layer may then be increased in thickness to any desired extent in the same bath by electrodeposition at current densities of 1 to 3 amps per sq. dm.

Copper surfaces thus prepared are then coated galvanically with chromium, nickel, cobalt and rhodium.

The glossy metal surface thus prepared and then stored for fifteen hours exhibits excellent adhesion whose stripping strength with respect to the plastics surface, measured on a test specimen 2.5 cm. in width and 5 cm. in length, is about 3 kg.

If a molding of polyvinyl chloride or of a cured polyester resin of a polyester from phthalic acid, maleic acid and propylene glycol to which styrene has been added be used instead of a molding of a copolymer of acrylonitrile, styrene and polybutadiene and a metallic coating is applied as described above to this molding, stripping strengths of 4.5 and 2.5 kg. respectively are measured under the same conditions.

The invention is hereby claimed as follows:

1. A method for metallizing surfaces of plastics comprising (a) coating said surfaces with a layer of small iron particles finely dispersed in a polyurethane binder cured on said surface, the amount of the dispersed iron particles being 200 to 450% by weight, based on the weight of the binder, the mean particle size of said iron particles being about 0.1 to 1 micron, (b) drying the layer and (c) replacing at least a portion of the iron in said layer with a member from the group consisting of copper and silver by treating the resulting layer with an aqueous acidic solution of a salt of a metal which is a member of the group consisting of copper and silver to provide a tightly adherent, conductive coating of one of said metals.

2. A method as claimed in claim 1 wherein said binder comprises a mixture of a polyurethane and at least 20% by weight, based on the polyurethane, of another polymer binder, the latter binder being vinyl polymer, polyester, polyamide or nitrocellulose.

3. A method as claimed in claim 1 wherein the polyurethane is the reaction product of (a) a polyisocyanate and (b) a soluble organic compound containing at least two hydroxy groups per molecule and selected from the group consisting of a polyester prepared essentially from a hydrocarbon substituted by one to three carboxy groups and 0 to 1 hydroxy group having two to eighteen carbon atoms and a polyhydric aliphatic alcohol having two to twelve carbon atoms and two to six hydroxy groups; a polyhydric polyalkylene compound, the oxyalkylene groups having from two to five carbon atoms; an essentially linear vinyl polymer having a carbon-carbon chain, containing between 0.1 and 38% by weight of hydroxy groups but essentially no other group which reacts with the isocyanate group, said polymer having a molecular weight between 1,000 and 100,000; and a polyhydric aliphatic alcohol as defined above.

4. A method as claimed in claim 3 wherein said surfaces are coated with a dispersion of the iron particles in a mixture of the polyisocyanate, the organic compound containing at least two hydroxy groups and an organic solvent which dissolves these compounds and does not react with isocyanates.

5. A plastic article having a surface coated with a polyurethane binder which is cured on said surface, said binder having dispersed therein 200–450% by weight, based on the polyurethane, of iron particles having a mean particle size of about 0.1 to 1 micron, and a conductive coating of a metal selected from the group of copper and silver tightly bonded to said layer with replacement by said metal of at least a portion of said iron in said binder.

References Cited

UNITED STATES PATENTS

| | | |
|---|---|---|
| 1,388,325 | 8/1921 | Chadwick et al. 117—130UX |
| 2,992,137 | 7/1961 | Bunge et al. 117—31X |
| 3,144,352 | 8/1964 | Talley. |
| 3,226,256 | 12/1965 | Schneble, Jr., et al. |
| 3,242,005 | 3/1966 | Morita et al. |
| 3,247,017 | 4/1966 | Eichler. |

ALFRED L. LEAVITT, Primary Examiner

C. K. WEIFFENBACH, Assistant Examiner

U.S. Cl. X.R.

117—31, 72, 160, 161